United States Patent [19]

Murphy et al.

[11] 4,157,911
[45] Jun. 12, 1979

[54] DECARBONIZATION OF AMMONIUM POLYPHOSPHATE FERTILIZER SOLUTIONS

[75] Inventors: James F. Murphy, Danville; Elias A. Woycheshin, Livermore, both of Calif.

[73] Assignee: Kaiser Aluminum & Chemical Corporation, Oakland, Calif.

[21] Appl. No.: 955,730

[22] Filed: Oct. 30, 1978

[51] Int. Cl.$^2$ .......................... C05B 1/06; C05B 11/10
[52] U.S. Cl. .......................................... 71/34; 423/305
[58] Field of Search ................... 71/34, 64 C; 210/21; 423/305, 307, 315, 321 S

[56] References Cited

U.S. PATENT DOCUMENTS

| | | | |
|---|---|---|---|
| 3,619,161 | 11/1971 | Knarr et al. | 71/34 |
| 3,969,483 | 7/1976 | Stinson et al. | 423/321 S X |

Primary Examiner—Kenneth M. Schor
Attorney, Agent, or Firm—Paul E. Calrow; Andrew E. Barlay

[57] ABSTRACT

Ammonium polyphosphate fertilizer solutions contaminated with carbon and carbonaceous residues are decarbonized by a sequential treatment to produce a light-colored solution/slurry of fertilizer solution containing essentially no visible carbon. In the first step, a mixture of an organic amine with a quaternary ammonium salt is dispersed in the contaminated fertilizer solution. In the second step a water immiscible hydrocarbon of low polarity is incorporated into the fertilizer solution by low shear agitation. In the third step a very slow agitation of the mixed system provides for the rising and coalescence of the low density hydrocarbon droplets containing the carbonaceous particles into a layer above the fertilizer solution.

7 Claims, No Drawings

DECARBONIZATION OF AMMONIUM POLYPHOSPHATE FERTILIZER SOLUTIONS

BACKGROUND OF THE INVENTION

Carbon-free phosphoric acid can be used to make carbon-free ammonium polyphosphate solution by reaction of ammonia with the acid. However, carbon-free phosphoric acid requires that the phosphate rock from which the acid is produced be calcined to burn off organic residues. The energy required for calcining the rock can be saved if the calcination can be avoided; however, the acid produced from uncalcined rock contains carbonaceous residues. Further, ammonium polyphosphate solutions made from this "black acid" still contain these carbonaceous impurities especially if made by the direct ammoniation process which increases the amount of carbonaceous contaminant in the end product.

In the ammonium polyphosphate solution, made from carbon-contaminated phosphoric acid, it is common to find fine white particles which are formed from phosphates of metallic impurities like aluminum, iron and calcium in the system. These white impurities are commonly in suspension so that the ammonium polyphosphate can be said to be a solution/slurry. Since the white particulate contains phosphate, it has fertilizer values and should be retained in suspension. Thus the problem is one of removing black carbonaceous materials without removing the useful white phosphate-containing particulate, and the normal methods of solid/liquid separation, e.g., filtration, cannot be used. Many efforts have been made to clarify these carbon contaminated solutions without removal of the phosphate solids which indicates the seriousness of the problem.

Thus, in U.S. Pat. No. 3,619,161 (Nov. 9, 1971) a process has been described wherein an organic stratifying agent, such as alkyl benzene sulfonates, tall oil, tall oil fatty acids and ethoxylated fatty alcohols and acids, are added to the impure solutions. The treatment results in the generation of an organic phase containing the stratifying agent and a concentration of carbonaceous impurities and a polyphosphate phase of reduced carbonaceous impurity content. Although the treatment removes some carbonaceous impurities from the polyphosphate phase, the residual black color was found to be still objectionable.

In U.S. Pat. No. 3,630,711 (Dec. 28, 1971) it has been suggested that the same carbonaceous impurities can be removed from ammonium polyphosphate solutions by treating the solution with an aliphatic organic amine compound, such as having 12–22 carbon atoms. The addition of amines to the impure ammonium polyphosphate solution results in improved clarity, however, the color improvement is still below the desired limits and the solution treated with the organic amine often fails to pass the required color standards.

To improve the deficiencies of the prior art purification processes it has been recommended in U.S. Pat. No. 3,969,483 (July 13, 1976) to employ as carbonaceous impurity-removing agent a mixture of a water-insoluble organic primary amine and a quaternary ammonium chloride. The recommended mixture provides improved clarity to the ammonium polyphosphate solution, but in many instances the treatment still results in an insufficient degree of carbonaceous impurity removal and the treated solution will be commercially unacceptable.

It has been now found that significantly improved carbonaceous impurity removal can be achieved from contaminated ammonium polyphosphate solutions by a sequential treatment with a combination of treating agents. The significantly improved carbonaceous impurity removal can be achieved by first adding to the impure solution a mixture of a water-insoluble, organic primary amine and a quaternary ammonium salt, followed by the addition of an oil, for example, fuel oil. The sequential treatment results in excellent color improvement, which cannot be achieved either by the prior art methods referred to above or by reversing the sequence of addition of the treating agents.

BRIEF SUMMARY OF THE INVENTION

A sequential process for removing carbonaceous impurities from ammonium polyphosphate fertilizer solutions, made by neutralization of wet process phosphoric acid with ammonia, is provided. In the process, a mixture of an organic amine and a quaternary ammonium salt is first dispersed in the impure fertilizer solution, followed by the addition of a water-immiscible hydrocarbon oil under a controlled rate of agitation. Reversing the sequence of addition and/or employing a rapid high shear rate of agitation for oil incorporation, fails to achieve the improved degree of carbonaceous impurity removal.

DETAILED DESCRIPTION OF THE INVENTION

This invention relates to the removal of carbonaceous impurities from liquid ammonium polyphosphate fertilizer solutions. More particularly, it concerns the sequential treatment of carbon-contaminated ammonium polyphosphate solutions with a mixture of a water-insoluble, organic primary amine and a quaternary ammonium chloride salt, followed by addition of a water-immiscible oil to the solution.

For the purposes of this invention the term "water-insoluble, organic primary amine" refers to a compound which has at least 12 carbon atoms in its structure, preferably between 14–22 carbon atoms. Typical primary amines falling within the scope of the above definition include tallow amine, dimethyl hydrogenated tallow amine, di(hydrogenated-coco) amine, the tallow amine, commercially available as "Armeen T", and dimethyl hydrogenated tallow amine, commercially available as "Armeen DMHTD" being the preferred amines. Salts of amines, such as the acetate or sulfate can also be utilized in lieu of the amine.

The expression "quaternary ammonium salt" as used herein refers to quaternary ammonium salts which are the reaction products of an organic amine with alkyl halide. For the purposes of the invention at least one of the alkyl substituents of the quaternary ammonium salt has 12 to 18 carbon atoms. The preferred halide moiety of the salt is the chloride.

It is to be understood that as primary amine, mixtures of amines can be employed, also the quaternary ammonium salt can be a mixture of salts.

The ammonium polyphosphate fertilizer solution to be purified or decarbonized by the method of the invention is the reaction product of ammonia and wet process phosphoric acid having a $P_2O_5$ content of at least about 40% by weight and up to about 70% by weight. The ammonium polyphosphate solution is further characterized by a viscosity of from about 500 to about 750 cps and a density of about 1.35–1.45 g/cm³. This ammonium polyphosphate compound is of commercial quality and is often referred to as a "10-34-0" ammonium polyphosphate solution, wherein the numbers refer to the nitrogen, phosphorous and potassium contents respectively.

For the removal of the carbonaceous impurity from the ammonium polyphosphate solution, as mentioned hereinbefore, a mixture of amine and quaternary ammonium salt is employed. In the mixture, the weight ratio of amine or amine salt to quaternary ammonium salt is kept at about 1-3:1. Preferably, the quantity of amine in the mixture is kept at about 40-60% by weight of the mixture.

The quantity of mixture incorporated in the impure ammonium polyphosphate solution is kept small, generally within the limits of about 0.05 to about 1% by weight of the fertilizer solution to be clarified. Addition of more than about 1% by weight of mixture does not materially improve the clarification.

The oil or hydrocarbon to be used in combination with the amine-quaternary ammonium salt is generally a straight or branched chained aliphatic or aromatic hydrocarbon of low polarity or nonpolar nature, further characterized by immiscibility in water. Typical oils or hydrocarbons suitable for accomplishing the purpose of the invention include kerosine, fuel oil 2; benzene, toluene, xylene and similar liquid hydrocarbons. The oil should be liquid at temperatures below about 65° C., since the ammonium polyphosphate solution is temperature sensitive, particularly at temperatures in excess of about 75° C. It is to be clearly understood that mixtures of aliphatic and/or aromatic hydrocarbons can also be successfully employed.

It is further to be understood that both the amine-quaternary ammonium salt mixture and the hydrocarbon or oil utilized in the instant process should have densities which are lower than the density of the fertilizer solution to be treated. This allows formation of two distinct phases and the removal of the carbonaceous impurity with the upper oil-containing layer.

The quantity of oil utilized in the carbonaceous impurity removal process is generally controlled by several factors. Thus, for example the configuration of the clarification vessel influences the minimum quantity to be added, vertically positioned cylindrical vessels of large diameter require more oil than for example, narrow tower-shaped vessels of relatively small diameter. Also, the minimum quantity of oil is influenced by the desire of obtaining a clearly definable boundary layer between the oil phase and the ammonium polyphosphate phase. The quantity of oil to be utilized in the process is most conveniently determined by a simple trial and error method accomplished in small scale prior to the actual clarification. Notwithstanding the above, it has been found that oil quantities within the range of about 5-50% by weight of the fertilizer solution to be treated generally accomplish the desired results without waste.

Incorporation of the amine-quaternary ammonium salt mixture and the oil in the fertilizer solution is carried out in a sequential manner. It has been found that in order to obtain the optimum results the amine-quaternary ammonium salt mixture should be dispersed in the fertilizer solution/slurry first, followed by addition of the oil after satisfactory dispersion of the amine-quaternary ammonium salt mixture in the fertilizer solution has been achieved. Then the oil is added to the fertilizer solution in such a manner as to obtain good contact between the oil and the carbonaceous particulate in the fertilizer solution/slurry.

It has been found that for achieving the desired clarification of the contaminated ammonium polyphosphate solution, the amine-quaternary ammonium salt mixture should be thoroughly blended with the fertilizer solution prior to the addition of the oil. Blending can be accomplished by agitating the cold fertilizer solution containing the mixture at an rpm in excess of about 100, preferably up to about 3,000 rpm. While higher stirring speeds (high shear) are not necessary if sufficient time is available for full dispersion, it has been found that the dispersion is more rapid with high speed, high shear stirring. By "high shear" as used in the present invention, a force is understood which is sufficient to obtain maximum dispersion of the amine-quaternary ammonium salt mixture in the fertilizer solution. If the fertilizer solution is warm, that is in the temperature range of about 40°-60° C., its viscosity is sufficiently reduced to allow more rapid distribution of the amine-quaternary ammonium salt mixture at the same or lower stirring speeds or shear rates.

After dispersion of the mixture, the oil is added to the treated fertilizer solution. It has been found that for best results in terms of clarification, the blending of the oil in the fertilizer solution should be accomplished at a rate of agitation, generally below that at which significant emulsification of the oil is produced. More rapid agitation can cause emulsification through the entire fertilizer solution making the later separation of the carbon-containing oil droplets slower and producing a less distinct interface between the oil and fertilizer solution.

Surprisingly, it has been found that unless the sequence of incorporation of the amine-quaternary ammonium salt mixture and the oil conforms to the method shown above, the results of the purification will be unsatisfactory.

If the oil is added first to the fertilizer solution, followed by addition of the amine-quaternary ammonium salt mixture, the carbonaceous impurity removal from the fertilizer solution is much less effective. Preblending of the amine-quaternary ammonium salt mixture with the oil prior to addition to the fertilizer solution provides slightly better results in terms of carbonaceous impurity removal, but still the degree of purification will be significantly lower than in following the recommended sequence.

The underlying reasons for this unexpected difference in behavior are unknown. However, without being bound to any particular theory, it is postulated that the amine-quaternary salt mixture adsorbs on the carbonaceous surfaces to provide increased hydrophobicity to the dispersed carbon impurity and the subsequent mixing of the oil with the treated fertilizer solution, allows the transfer of the conditioned carbon impurity from the aqueous fertilizer solution to the essentially water-immiscible oil droplets, which because of their lower density rise and coalesce to form a carbon-containing oil layer on top of the clarified solution.

The following examples will further demonstrate the unique carbon removal results achieved by the sequential application of the treating agents described above.

EXAMPLE I

A carbon-contaminated ammonium polyphosphate fertilizer solution, prepared by the neutralization of wet process phosphoric acid of 54% by weight $P_2O_5$ content with ammonia was subjected to the carbon removal process of the invention. The fertilizer solution was characterized by a viscosity of 600 cps at 20° C., a density of 1.41 g/cm$^3$ and a dark gray-blackish color.

3,300 grams of this contaminated fertilizer solution was placed in a cylindrical vessel equipped with a variable speed agitator. The vessel was at room temperature.

Subsequently, an amine-quaternary ammonium salt treating agent was prepared by admixing equal weights of tallow amine and dimethyldi(hydrogenated-tallow) ammonium chloride. To the fertilizer solution 3.3 grams of this agent was then added under agitation and after completion of the addition, the mixture of the fertilizer solution and treating agent was agitated for about 10 minutes at the rate of about 2,000 rpm with a high shear impeller. Agitation was then discontinued and a 330 g charge of fuel oil No. 2 was added. The batch was then agitated with a low shear impeller for about 10 minutes at 1,600 rpm. Agitation at 16 rpm (low shear) was then instituted and the color change was periodically monitored. After 20 minutes significant decarbonization was observed. After a 22 hour period, essentially all of the black coloration was removed from the fertilizer solution by being transferred into the oil phase which constituted the upper phase in the vessel. A distinct interface was generated between the oil and fertilizer solution phases which allowed ready separation of the purified fertilizer solution from the oil phase containing the carbonaceous impurity.

The example was repeated by using only the amine-quaternary ammonium chloride mixture as taught in U.S. Pat. No. 3,969,483. Although some improvement was observed in the color of the treated fertilizer solution the degree of clarification obtained was significantly lower than obtained with the sequential treatment as taught by the invention.

The test was also repeated by using tall oil as treating agent in accordance with U.S. Pat. No. 3,619,161. The treated fertilizer solution, although lighter in color than the untreated solution, was considerably darker than the solution treated by the sequential method of the invention.

A test was also run by using as treating agent octadecyl amine alone as disclosed in U.S. Pat. No. 3,630,711. The decarbonization obtained with this treating agent was considerably less effective than the purification achieved by the sequential method of the invention. For illustration purposes the color changes obtained by the novel method and by the prior art treatments have been compiled in the Table I. Color comparison was done on a scale of 0 to 10, where 10 designates the untreated ammonium polyphosphate solution, while 0 denotes a carbonaceous impurity-free ammonium polyphosphate fertilizer solution prepared from a high grade, purified phosphoric acid.

TABLE I

COLOR COMPARISON OF VARIOUSLY TREATED CARBON-CONTAMINATED AMMONIUM POLYPHOSPHATE SOLUTIONS

| METHOD OF TREATMENT | COLOR |
| --- | --- |
| Untreated Polyphosphate Solution | 10 |
| Sequential Treatment with Amine-Quaternary Ammonium Salt and Hydrocarbon Oil | 0 |
| Amine Alone | 5 |
| Quaternary Ammonium Salt Alone | 7 |
| Hydrocarbon Oil Alone | 8 |
| Ammonium Polyphosphate Made From Pure H$_3$PO$_4$ | 0 |

TABLE I-continued

COLOR COMPARISON OF VARIOUSLY TREATED CARBON-CONTAMINATED AMMONIUM POLYPHOSPHATE SOLUTIONS

| METHOD OF TREATMENT | COLOR |
| --- | --- |
| From Pure H$_3$PO$_4$ | 0 |

EXAMPLE II

In this Example the importance of sequential treatment is investigated. To demonstrate that only by sequential addition of the treating agents, i.e., addition of the amine-quaternary ammonium salt mixture followed by treatment with the oil, achieves improved carbonaceous impurity removal, a test (a) was carried out where the sequence of addition was reversed and a test (b) was also conducted where the amine-quaternary ammonium salt mixture was preblended with the oil prior to addition to the contaminated ammonium polyphosphate fertilizer solution.

The colors obtained in both tests (a) and (b) were compared to the result obtained by using the novel sequential treatment and are tabulated in Table II.

TABLE II

COMPARATIVE RESULTS OBTAINED BY VARYING THE SEQUENCE OF TREATING AGENT ADDITIONS

| SEQUENCE OF ADDITION | COLOR* |
| --- | --- |
| Untreated Ammonium Polyphosphate | 10 |
| 1. Addition of Amine-Quat. Ammonium Salt<br>2. Addition of Oil | 0 |
| 1. Addition of Oil<br>2. Addition of Amine-Quat. Ammonium Salt | 6 |
| Addition of Agents as a Blend | 6 |

*On the same scale as in Example I

The results in Table II clearly demonstrate the superior results achieved by following the novel sequence of addition of the treating agents.

Tests were also carried out by varying the organic amines and the quaternary ammonium salts within the amine-quaternary ammonium salt mixture. It has been found that by employing organic amines in the mixture which possess 12–18 carbon atoms or quaternary ammonium salts, having at least one alkyl substituent having 14 to 22 carbon atoms, in addition to meeting the requirements set forth hereinbefore, essentially the same good decarbonization results can be achieved.

What is claimed is:

1. In the process of removing carbonaceous impurities from aqueous ammonium polyphosphate fertilizer solutions by treating the solutions with a mixture of an organic amine and a quaternary ammonium salt or with a water-immiscible hydrocarbon, the improvement which comprises sequentially applying to the impure ammonium polyphosphate solution a mixture of an organic amine and a quaternary ammonium salt, followed by the addition of a water-immiscible hydrocarbon, wherein the organic amine-quaternary ammonium salt mixture is fully dispersed at high shear in the solution and then the water-immiscible hydrocarbon is added to the solution at a low rate of shear, and then agitation of the treated fertilizer solution is continued at a low rate of agitation and essentially no shear until the formation of an essentially carbonaceous impurity-free aqueous phase and an organic phase separated from the aqueous phase by a distinct interface and containing substantially all of the carbonaceous impurities, separating the phases and recovering an aqueous purified ammonium polyphosphate fertilizer solution.

2. Process according to claim 1, wherein the organic amine is tallow amine and the quaternary ammonium salt is dimethyldi(hydrogenated tallow) ammonium chloride.

3. Process according to claim 1, wherein the mixture of organic amine and quaternary ammonium salt the weight ratio of amine to quaternary ammonium salt is kept at 1–3:1.

4. Process according to claim 1, wherein the quantity of organic amine-quaternary ammonium salt mixture added to the fertilizer solutions is in the range of about 0.05–1% by weight of the solution.

5. Process according to claim 1, wherein the water-immiscible hydrocarbon is selected from the group consisting essentially of fuel oil No. 2, kerosine, benzene, toluene and xylene.

6. Process according to claim 1, wherein the quantity of oil added to the fertilizer solutions is within the range of about 5–50% by weight of the solution.

7. Process according to claim 1, wherein the fertilizer solution is a 10-34-0 ammonium polyphosphate solution.

* * * * *